US009322862B2

(12) United States Patent
Chou et al.

(10) Patent No.: US 9,322,862 B2
(45) Date of Patent: Apr. 26, 2016

(54) CAPACITIVE SENSING ARRAY DEVICE WITH HIGH SENSITIVITY AND ELECTRONIC APPARATUS USING THE SAME

(71) Applicant: Bruce C.S. Chou, Hsin Chu (TW)

(72) Inventors: Bruce C.S. Chou, Hsin Chu (TW); Shih Chieh Hsu, Hsinchu (TW)

(73) Assignee: J-METRICS TECHOLOGY CO., LTD, Taipei (TW)

( * ) Notice: Subject to any disclaimer, the term of this patent is extended or adjusted under 35 U.S.C. 154(b) by 201 days.

(21) Appl. No.: 14/045,514

(22) Filed: Oct. 3, 2013

(65) Prior Publication Data
US 2014/0103941 A1  Apr. 17, 2014

(30) Foreign Application Priority Data
Oct. 12, 2012  (TW) .............................. 101137686 A

(51) Int. Cl.
*G01R 27/26*  (2006.01)
*G06F 3/044*  (2006.01)
*G06F 3/041*  (2006.01)
*G01R 1/00*  (2006.01)
(Continued)

(52) U.S. Cl.
CPC ............ *G01R 27/2605* (2013.01); *G06F 3/044* (2013.01); *G06F 3/0416* (2013.01); *G01R 1/00* (2013.01); *G06F 1/00* (2013.01); *G06F 2101/00* (2013.01); *H03K 17/9622* (2013.01); *H03K 2217/960705* (2013.01)

(58) Field of Classification Search
CPC ... G06F 1/00; G06F 2101/00; G06F 2200/00; G06F 2201/00; G01R 1/00
See application file for complete search history.

(56) References Cited

U.S. PATENT DOCUMENTS

| 6,088,471 | A  | * | 7/2000 | Setlak   | A61B 5/1172 382/116 |
| 2003/0016849 | A1 | * | 1/2003 | Andrade  | G06K 9/0002 382/124 |
| 2003/0020495 | A1 | * | 1/2003 | Andrade  | G01D 5/24 324/686 |

(Continued)

FOREIGN PATENT DOCUMENTS

| CN | 101666832 A | 3/2010 |
| JP | 2005-156347 A | 6/2005 |

(Continued)

*Primary Examiner* — Huy Q Phan
*Assistant Examiner* — Temilade Rhodes-Vivour
(74) *Attorney, Agent, or Firm* — Muncy, Geissler, Olds & Lowe, P.C.

(57) ABSTRACT

A capacitive sensing array device of an electronic apparatus includes sensing electrodes, a shielding conductor layer, a coupling signal source, a constant voltage source and switch modules. The coupling signal source provides a coupling signal coupled to an object. The constant voltage source provides a constant voltage to the shielding conductor layer to form a stable vertical parasitic capacitor between the shielding conductor layer and each sensing electrode. Each switch module is electrically connected to the constant voltage source via the corresponding sensing electrode. When one sensing electrode is selected to perform sensing, the corresponding switch module is configured as an open-circuited state such that the selected sensing electrode is disconnected from the constant voltage source, while the other sensing electrodes are electrically connected to the constant voltage source to form a stable horizontal parasitic capacitor between the selected sensing electrode and the other sensing electrodes.

15 Claims, 10 Drawing Sheets

(51) Int. Cl.
*G06F 1/00* (2006.01)
*H03K 17/96* (2006.01)

(56) References Cited

U.S. PATENT DOCUMENTS

2003/0190061 A1  10/2003  Chou et al.
2009/0283845 A1  11/2009  Chou
2010/0052700 A1   3/2010  Yano et al.
2012/0075249 A1*  3/2012  Hoch .......................... 345/174

FOREIGN PATENT DOCUMENTS

TW         583592       4/2004
TW      200950017 A    12/2009

* cited by examiner

CAPACITIVE SENSING ARRAY DEVICE WITH HIGH SENSITIVITY AND ELECTRONIC APPARATUS USING THE SAME

This application claims priority of No. 101137686 filed in Taiwan R.O.C. on Oct. 12, 2012 under 35 USC 119, the entire content of which is hereby incorporated by reference.

BACKGROUND OF THE INVENTION

1. Field of the Invention

The invention relates to a capacitive sensing array device and an electronic apparatus using the same, and more particularly to a capacitive sensing array device with high sensitivity and an electronic apparatus using the same.

2. Related Art

The conventional capacitive sensing technology for sensing the skin of the human body may be applied to, for example, the fingerprint sensor for sensing finger's textures or a capacitive touch panel or a capacitive touch screen.

More particularly, the basic structure of the portion of the sensor in contact with the skin's texture to sense the skin's texture is an array-type sensing member. That is, several sensing members with the same structures constitute a two-dimensional array sensor. When a finger is placed on the array sensor, for example, the ridge of the finger's texture is in direct contact with the array sensor, and the valley of the finger's texture is separated from the array sensor by a gap, so that the two-dimensional capacitive image of the finger's texture may be captured, and this is the basic principle of the capacitive skin texture sensor.

In the most frequently seen sensing member structure, due to the electroconductive property of the human body, the skin in contact with the sensor may be regarded as an equal-potential electrode plate and each sensing member may be regarded as a plate electrode, so that a capacitor is formed between each sensing member and the skin. The materials disposed between the electrode plates include the cuticle on the surface of the finger's skin and a sensor protection layer disposed on the sensing electrode and in contact with the skin. The protection layer may be a single insulating layer or may contain multiple insulating layers and must have the environment-corrosion-resistant property, the impact-resistant property, the wearing-resistant property, the electrostatic-discharge-resistant property and the like.

In order to achieve the above-mentioned properties of the protection layer, one direct method is to increase the thickness of the protection layer. However, the too-thick protection layer causes the very small sensing capacitance, thereby decreasing the sensitivity.

FIG. 1 is a schematic illustration showing an assembled structure of a conventional capacitive fingerprint sensor 500. As shown in FIG. 1, the conventional capacitive fingerprint sensor 500 is usually manufactured in two stages. In the first stage of manufacturing a fingerprint sensing chip 510, semiconductor manufacturing processes are utilized to form sensing members 514 and chip bonding pads 515 on a semiconductor substrate 511, and then a chip protection layer 512 is formed on the sensing members 514 to provide the protective and impact-resistant properties. In the second stage, which is a packaging stage, the fingerprint sensing chip 510 is placed on a package substrate 520, multiple wires 530 are bonded to the chip bonding pads 515 and package bonding pads 525 by way of wire bonding, and than a package protection layer (or referred to as a molding compound layer) 540 is provided to cover the wires 530 and the bonding pads 515 and 525, and only the region with the sensing member array is exposed. Such conventional package processes require a special mold and a special process flow to protect the sensing member region from being covered by the molding compound and need a special machine. So, the cost is high.

In the existing IC wire-bonding technology, the distance from the chip surface 513 to the package surface 523 is greater than or equal to about 100 microns (um). Taking the fingerprint sensor with the specification of 500 DPI as an example, the area of each sensing member 514 is about 50 um×50 um. If the molding compound is to deploy on the sensing member, according to the dielectric constant of the commercial molding compound, the calculated capacitance of the sensing member is smaller than about 1 fF, which is too small to design a sensing circuit. If the thickness control of the package substrate, the thickness control of the chip and the like are considered at the same time, this distance further causes the great sensing error.

Thus, the conventional package protection layer 540 cannot be disposed above and cannot cover the sensing member 514. So, the chip protection layer 512 has to be formed in the first stage, and the thickness (about 1 to 20 microns) of the chip protection layer 512 cannot be too thick to affect the sensing capacitance. Consequently, in addition to the high cost, it is a great challenge to the requirements on the environment-corrosion-resistant property, the impact-resistant property, the wearing-resistant property, the electrostatic-discharge-resistant property and the like of the sensor.

FIG. 2 is a schematic illustration partially showing sensing electrodes of a conventional capacitive fingerprint sensor 600. As shown in FIG. 2, in addition to the sensing capacitor Cf between each sensing electrode 610 of the capacitive fingerprint sensor 600 and the finger F, a parasitic capacitor Cp1 is present when viewed from the sensing electrode 610 to the inside of the chip. In addition, because the sensor device is an array device having a plurality of sensing members, a parasitic capacitor Cp2 is also present between each of the sensing electrodes 610 and each of its neighboring sensing electrodes 610. These parasitic capacitors are in the fluctuating states. This non-constant parasitic capacitor interferes with the measurement, and is one of the main reasons of the incapability of achieving the high sensitivity. In order to achieve the sensitivity of Cf smaller than 1 fF, the solution of the interference between Cp1 and Cp2 is the most important issue.

SUMMARY OF THE INVENTION

It is therefore an object of the invention to provide a capacitive sensing array device with high sensitivity and an electronic apparatus using the same, in which the influence of the parasitic capacitor can be eliminated, and the high sensitivity property can be provided when the thick protection layer is present.

Another object of the invention is to provide a capacitive sensing array device with the high sensitivity and the gain adjustment of the sensing member, and an electronic apparatus using the same, in which the property difference caused by the manufacturing tolerance can be eliminated, and the uniformity of the images obtained by the sensor device can be enhanced.

To achieve the above-identified objects, the invention provides a capacitive sensing array device with high sensitivity. The capacitive sensing array device includes sensing electrodes, a shielding conductor layer, a coupling signal source, a constant voltage source and switch modules. The sensing electrodes are separately arranged in an array. Each of the sensing electrodes and an object form a sensing capacitor.

The shielding conductor layer is disposed below the sensing electrodes. The coupling signal source provides a coupling signal coupled to the object. The constant voltage source provides a constant voltage to the shielding conductor layer so that a stable vertical parasitic capacitor is formed between the shielding conductor layer and each of the sensing electrodes. Each of the switch modules is electrically connected to the constant voltage source via a corresponding one of the sensing electrodes. When one of the sensing electrodes is selected to perform sensing, the switch module corresponding to the selected sensing electrode is configured as an open-circuited state such that the selected sensing electrode is disconnected from the constant voltage source, while the other sensing electrodes are electrically connected to the constant voltage source via the other corresponding switch modules configured as short-circuited states, so that a stable horizontal parasitic capacitor is formed between the selected sensing electrode and the other sensing electrodes.

The invention also provides an electronic apparatus including a body, a display, a capacitive sensing array device, a housing and a processor. The display is mounted on the body and displays a frame. The capacitive sensing array device is mounted on the body. The housing is mounted on the body and covers the display and the capacitive sensing array device, wherein the capacitive sensing array device senses a pattern of the object via the housing. The processor is electrically connected to the capacitive sensing array device and the display, processes the pattern of the object and interacts with a user through the display.

With the capacitive sensing array device of the invention, even if the capacitive sensing array device is covered by the protection layer and the houing in contact with the finger, the high sensitivity still can be obtained, and the sensed result cannot be affected by the parasitic capacitor. Furthermore, the uniformity of the sensed image can be further enhanced according to the self gain adjustment.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 3:
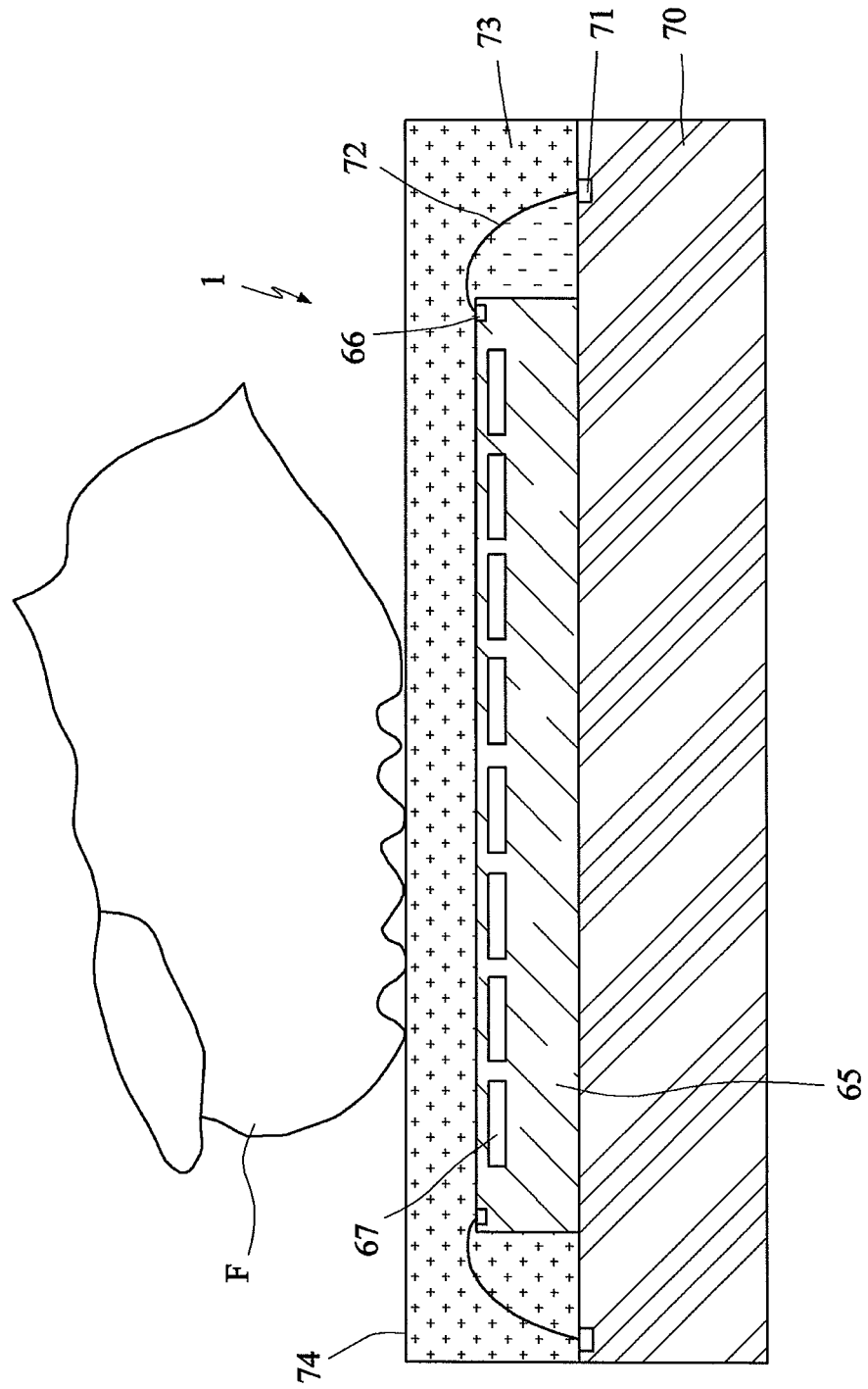
FIG. 3 is a schematic illustration showing a structure of a capacitive sensing array device according to a first embodiment of the invention.
Figure 4:
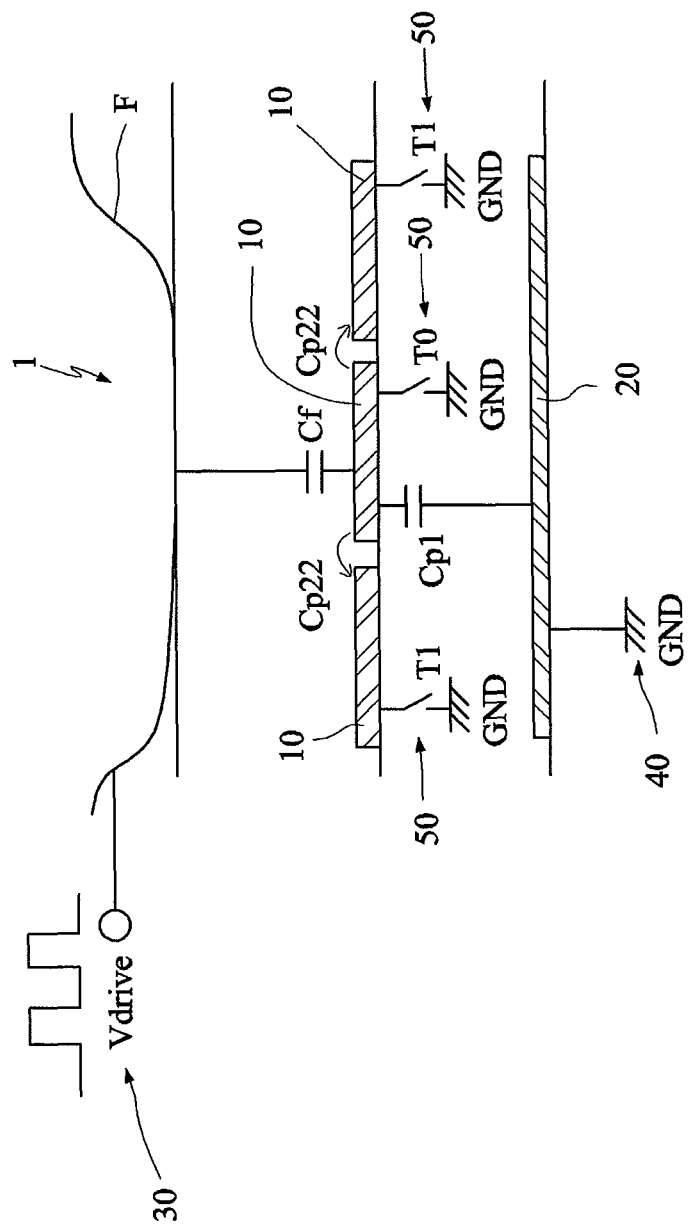
FIG. 4 is a schematic illustration partially showing a structure design of sensing electrodes of the capacitive sensing array device according to the first embodiment of the invention.
Figure 5:
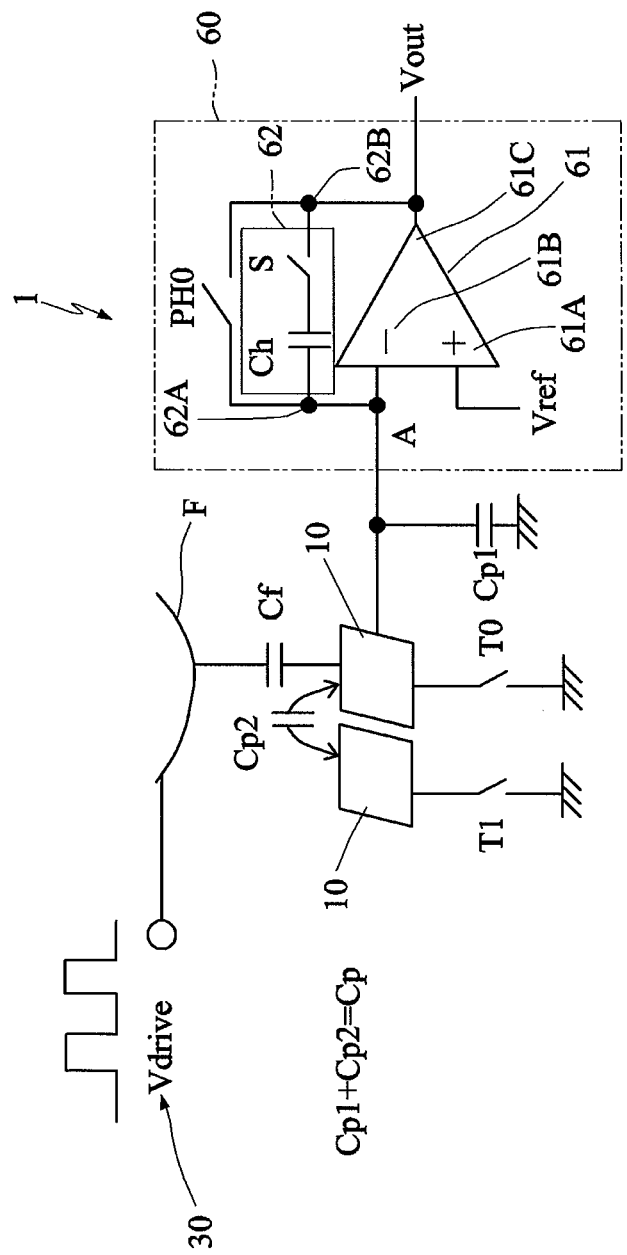
FIG. 5 is a schematic illustration showing a single sensing member and its corresponding sensing circuit of the capacitive sensing array device according to the first embodiment of the invention.

FIG. 3 is a schematic illustration showing a structure of a capacitive sensing array device 1 according to a first embodiment of the invention. FIG. 4 is a schematic illustration partially showing a structure design of sensing electrodes of the capacitive sensing array device 1 according to the first embodiment of the invention. FIG. 5 is a schematic illustration showing a single sensing member and its corresponding sensing circuit of the capacitive sensing array device 1 according to the first embodiment of the invention. Referring to FIGS. 3 to 5, the capacitive sensing array device 1 of this embodiment includes sensing electrodes 10, a shielding conductor layer 20, a coupling signal source 30, a constant voltage source 40, switch modules 50, a semiconductor substrate 65, a package substrate 70, wires 72 and a package protection layer 73.

Figure 1:
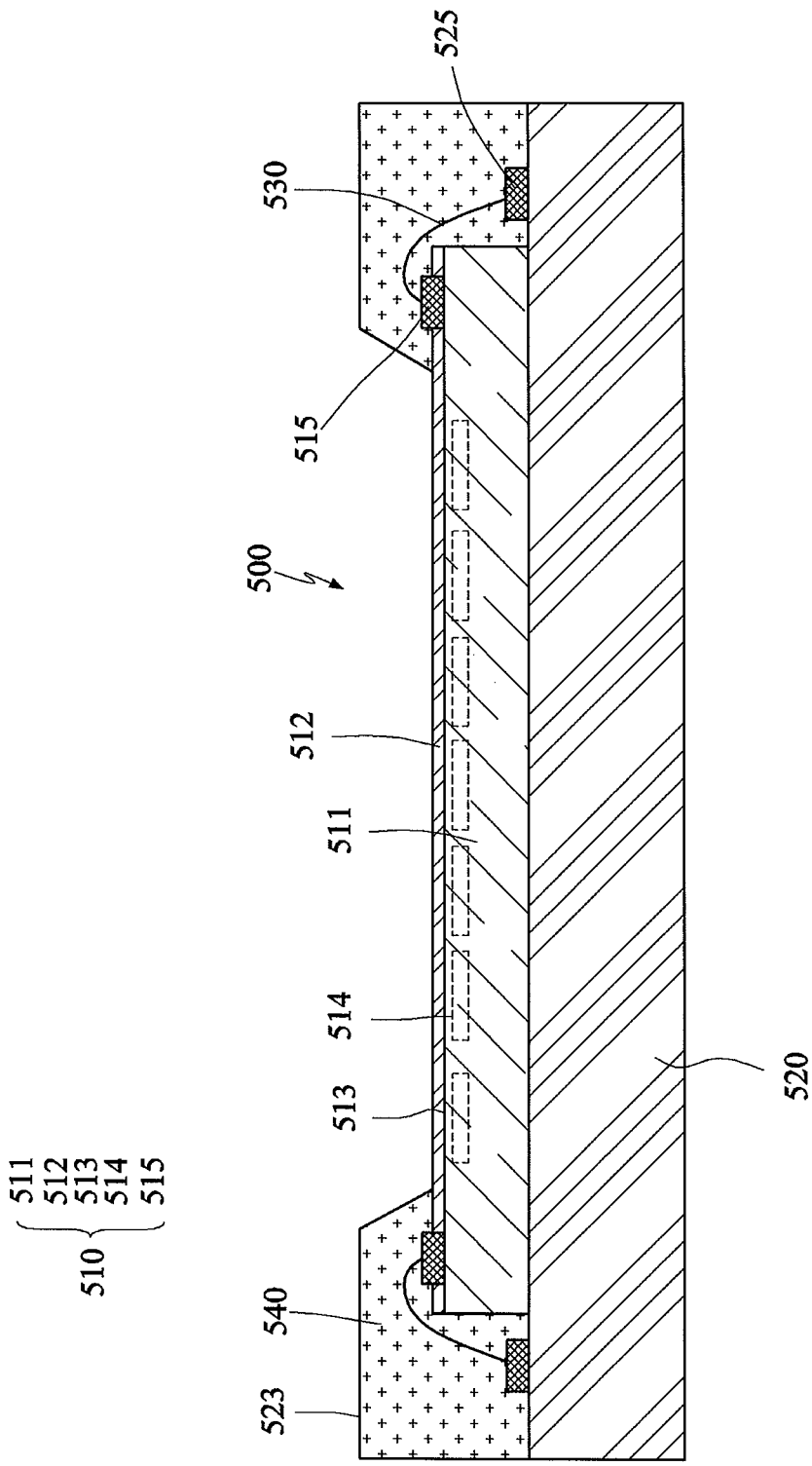
FIG. 1 is a schematic illustration showing a structure of a conventional capacitive fingerprint sensor.
Figure 2:
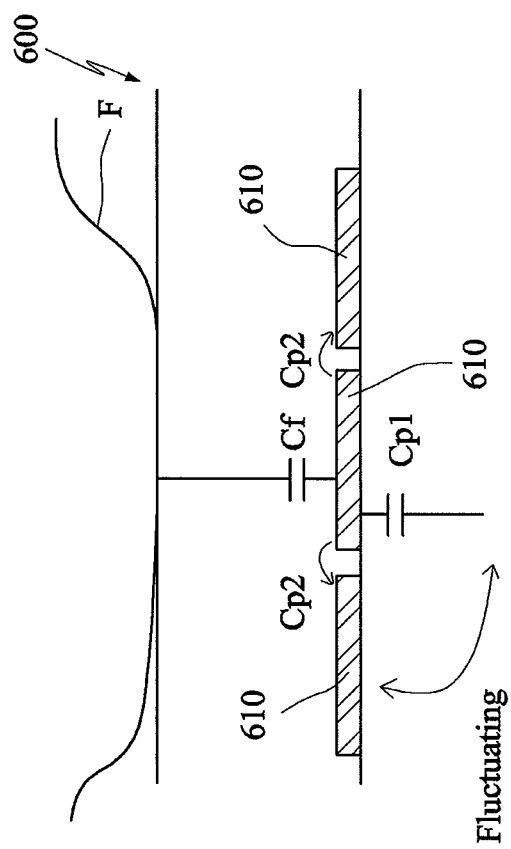
FIG. 2 is a schematic illustration partially showing sensing electrodes of a conventional capacitive fingerprint sensor.

The sensing electrodes 10, the shielding conductor layer 20, the coupling signal source 30, the constant voltage source 40 and the switch modules 50 may constitute a portion of a sensing member 67 or the whole sensing member, and are formed in the semiconductor substrate 65. Herein, the manufacturing processes applied to the semiconductor substrate include complete front-end and post-end semiconductor manufacturing processes, such as the transistor device manufacturing processes and the wire connecting processes. In this embodiment, these structures are manufactured using, for example, but without limitation to, semiconductor manufacturing processes (e.g., CMOS processes), so that the manufacturing cost is significantly decreased. The semiconductor substrate 65 is disposed on the package substrate 70. Multiple first bonding pads 71 on the package substrate 70 may be electrically connected to multiple second bonding pads 66 on the semiconductor substrate 65 through the wires 72 by way of wire bonding to provide the input/output interface for the signal and the power of the package product. The package protection layer 73 is implemented using a molding compound, typically used in the package, to cover the semiconductor substrate 65, the wires 72, the first bonding pads 71 and the second bonding pads 66. In one example, the material of the package protection layer 73 includes the epoxy resin serving as the molding compound (molding compound), and the package protection layer 73 has the thickness greater than or equal to 100 um, and the hardness greater than 5H, so that the wearing-resistant property, the electrostatic-discharge-resistant property, the impact-resistant property and the like may be provided. In addition, the package protection layer 73 has an exposed surface 74 in contact with an object F, wherein the exposed surface 74 is a flat surface, and the overall exposed surface 74 serves as a complete upper flat surface of the capacitive sensing array device 1 without the concave surface of FIG. 1. Thus, the requirements of the full flat surface device can be satisfied.

Regarding the detailed structure of the sensing member 67, these sensing electrodes 10 are separately arranged in an array including, without limitation to, a one-dimensional array or a two-dimensional array. Each sensing electrode 10 and the object F form a sensing capacitor Cf. In this example, the object is a finger. However, the invention is not restricted thereto. Any device operating according to the capacitive sensing principle may be used as the sensing array device of the invention.

The shielding conductor layer 20 is disposed below the sensing electrodes 10. The shielding conductor layer 20 and each sensing electrode 10 form a vertical parasitic capacitor Cp1. The shielding conductor layer 20 may be a piece of conductor layer, may also be multiple conductor layers, and may correspond to the sensing electrodes 10 in a one-to-one, one-to-many or many-to-one manner so as to provide the constant parasitic capacitor.

In FIG. 4, the middle sensing electrode 10 and its surrounding members also form a horizontal parasitic capacitor Cp22. These horizontal parasitic capacitors Cp22 are equivalent to a horizontal parasitic capacitor Cp2 in FIG. 5. Thus, the sensing electrode 10 and its neighboring sensing electrodes 10 form the horizontal parasitic capacitor Cp2.

The shielding conductor layer 20 and the sensing electrodes 10 may be formed using the metal manufacturing process of the semiconductor manufacturing processes. The material between the shielding conductor layer 20 and the sensing electrodes 10 may contain a single-layer or multiple inter-metal dielectrics (IMD) layers. The sensing members may be formed using multiple metal and IMD manufacturing processes of the semiconductor manufacturing processes.

The coupling signal source 30 is coupled to the object F and provides a coupling signal Vdrive coupled to the object F. The coupling signal Vdrive may be directly or indirectly coupled to the object F, wherein the direct coupling may transfer the coupling signal to the object F using a conductor in contact with the object F, and the indirect coupling may be implemented by disposing a dielectric layer between the conductor and the object F. Since the direct coupling and the indirect coupling are well known in the art, detailed descriptions and restrictions thereof will be omitted.

The constant voltage source 40 provides a constant voltage to the shielding conductor layer 20 so that a stable vertical parasitic capacitor Cp1 is formed between the shielding conductor layer 20 and each sensing electrode 10. In this embodiment, the grounding voltage (GND) of 0V serves as the constant voltage. However, the invention is not restricted thereto, the constant voltage may also be equal to 3.3V, 5V or the like to achieve the effect of the invention. However, it is to be noted that the constant voltage source must provide the very stable voltage, which cannot fluctuate under the external interference. This is because the fluctuating voltage would decrease the sensitivity of the sensing member.

These switch modules 50 are only represented by T0 and T1 in FIGS. 4 and 5, and these switch modules 50 are electrically connected to the constant voltage source and these sensing electrodes 10 in a one-to-one manner. When one sensing electrode 10 is selected to perform the sensing, the switch modules 50 are configured such that an open-circuited state is formed between the sensing electrode 10 and the constant voltage source 40, while the short-circuited state is formed between the other sensing electrodes 10 and the constant voltage source 40, so that a stable horizontal parasitic capacitor Cp2 is formed between the selected sensing electrode 10 and the other sensing electrodes 10, and that the output of the capacitive sensing array device 1 does not relate to the horizontal parasitic capacitor Cp2 and the vertical parasitic capacitor Cp1 (see the following derivation). The switch module 50 may be implemented by, for example but without limitation to, a transistor or any other suitable means. In FIGS. 4 and 5, when the middle sensing electrode 10 is selected to perform the sensing, the switch module T0 is in the open-circuited state, and the switch module T1 is in the short-circuited state (i.e., turned-on state). Consequently, the surrounding sensing electrodes 10 are grounded (or coupled to the constant voltage), while the bottom shielding conductor layer 20 is set as the grounded state (or coupled to the constant voltage). As a result, a stable shielding environment may be provided to completely surround the sensing electrode therein. Although a relatively large parasitic capacitor is still present between the sensing electrode and the neighboring shielding environment, this parasitic capacitor is different from the conventional design and has a constant and stable capacitance value. This is advantageous to the design of the sensing circuit, and is also a key point of the invention.

As shown in FIG. 5, the capacitive sensing array device 1 may further include reading circuits 60, which are electrically connected to the sensing electrodes 10 and output multiple output signals Vout, respectively. In this embodiment, in order to prevent the signal of each sensing electrode from being transmitted too far and interfered, each sensing member is configured to be connected to an operational amplifier for amplifying the sensing signal on site. Thus, the invention is free from the interference caused by the too-long transmission line (array device's usual issue). Therefore, each reading circuit 60 includes an operational amplifier 61, a tunable capacitor 62 and a reset switch PH0.

All or a portion of the operational amplifier 61 may be formed under the sensing electrode 10, and one sensing electrode 10 may correspond to one operational amplifier 61. Of course, multiple sensing electrodes 10 may also correspond to one operational amplifier 61. The operational amplifier 61 has a positive input terminal 61A, a negative input terminal 61B and an output terminal 61C. The negative input terminal 61B is electrically connected to the sensing electrode 10, and the positive input terminal 61A is electrically connected to a reference voltage Vref. The tunable capacitor 62 has a first terminal 62A electrically connected to the negative input terminal 61B, and a second terminal 62B electrically connected to the output terminal 61C. In this example, the tunable capacitor 62 is constituted by a capacitor Ch and a switch S. In this example, because only one capacitor Ch is provided, the switch S may be removed. The reset switch PH0 and the tunable capacitor 62 are connected in parallel.

According to the circuit diagram of FIG. 5, the output signal Vout may be derived according to the electrical charge conservation principle.

When Vdrive=0, the reset switch PH0 is in the short-circuited state, and the charge Q1 at the node A may be represented by:

$$Q1 = Cf \times (Vref - Vdrive) + Cp \times Vref = Cf \times Vref + Cp \times Vref.$$

When Vdrive is high, the reset switch PH0 is in the open-circuited state, and the charge Q2 at the node A may be represented by:

$$Q2 = Cf \times (Vref - Vdrive) + Cp \times Vref + Ch \times (Vref - Vout).$$

According to the electrical charge conservation principle, Q1=Q2 may be obtained.

That is, $$Cf \times Vref + Cp \times Vref = Cf \times Vref - Cf \times Vdrive + Cp \times Vref + Ch \times Vref - Ch \times Vout.$$

The expression may be simplified as:

$$Cf \times Vdrive - Ch \times Vref = -Ch \times Vout.$$

Then, it is obtained:

$$Vout = Vref - (Cf/Ch) \times Vdrive,$$

wherein Cp=Cp1+Cp2. According to the above-mentioned equation, it is found that the output signal Vout does not relate to the parasitic capacitors Cp1 and Cp2. As mentioned hereinabove, the feature of the invention is to stabilize the fluctuating value of the parasitic capacitor, which fluctuates due to the uncontrolled surrounding environment, so that the parasitic capacitor may be naturally neglected under the operation principle of the operational amplifier sensing circuit. In addition, Cf/Ch is a gain. In the practical design, Ch is as small as possible because the sensing signal may be amplified in each independent sensing member so that the sensing signal cannot be interfered in the transmission line to affect the signal quality. In one embodiment of the invention, Vdrive is equal to 3.3V, Vref is equal to 1.8V, and Ch ranges from 1 to 4 fF. However, the invention is not particularly restricted thereto.

Figure 6:
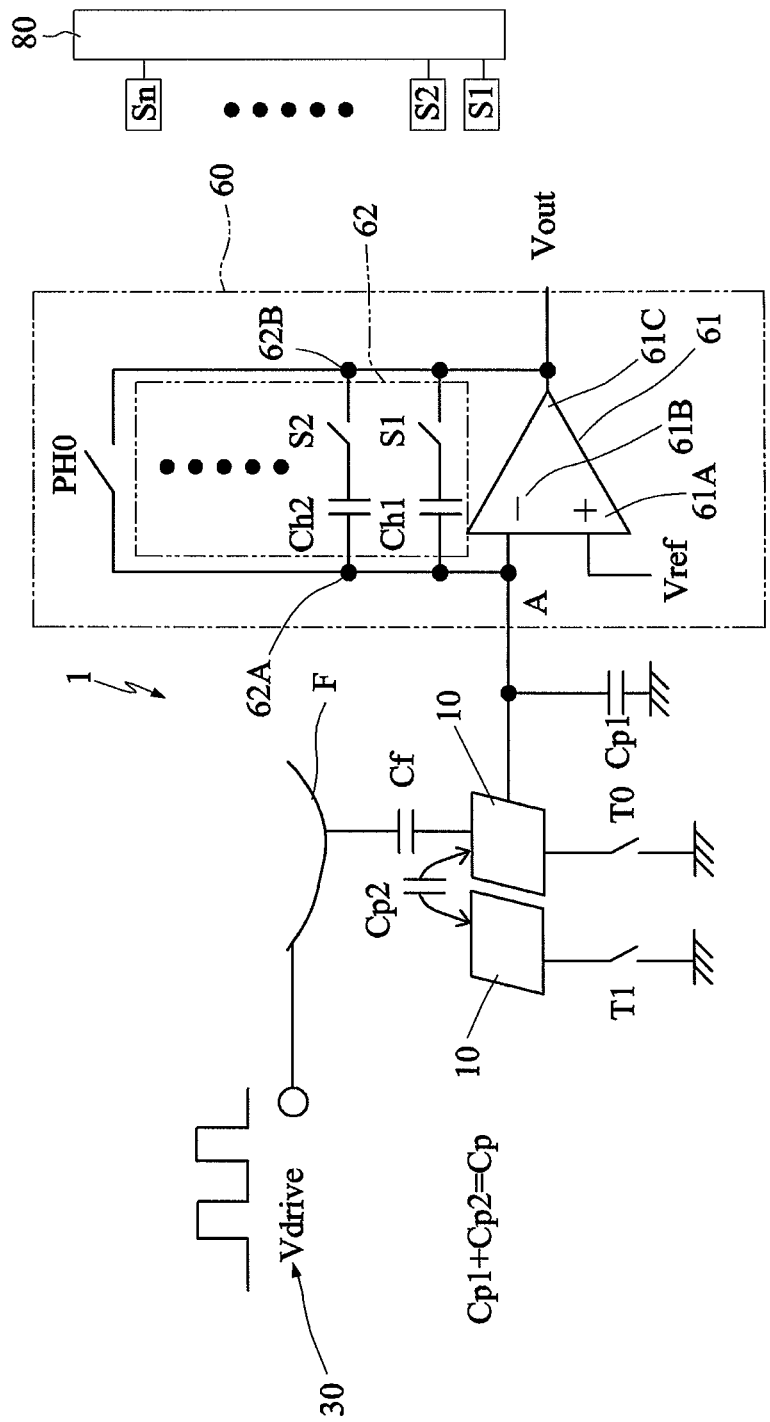
FIG. 6 is a schematic circuit diagram showing a single sensing member and its corresponding sensing circuit of a capacitive sensing array device according to a second embodiment of the invention.

FIG. 6 is a schematic circuit diagram showing a single sensing member and its corresponding sensing circuit of a capacitive sensing array device 1 according to a second embodiment of the invention. As shown in FIG. 6, this embodiment is similar to the first embodiment except for the difference that the tunable capacitor 62 includes reference capacitors Ch1 to CHn connected to the negative input terminal 61B and the output terminal 61C in parallel through multiple reference switches S1 to Sn, respectively. The capacitance of the tunable capacitor 62 may be adjusted by controlling the open-circuited states and the short-circuited states of the reference switches S1 to Sn.

In this example, the capacitive sensing array device 1 may further include a reference switch controller 80, which is electrically connected to the reference switches S1 to Sn, and controls the open-circuited states and the short-circuited states of the reference switches S1 to Sn. The reference switch controller 80 may turn on one of the reference switches S1 to Sn at a time. In this condition, the reference capacitors Ch1 to CHn are preferably configured to have multiple capacitances. Alternatively, the reference switch controller 80 may also turn on multiple ones of the reference switches S1 to Sn at a time. In this condition, these reference capacitors Ch1 to CHn have the same capacitance value. Of course, the reference capacitors Ch1 to CHn may also have different capacitance values. The short-circuited states or the open-circuited states of the reference switches S1 to Sn may also be controlled by another control unit.

Instead of sharing one gain adjusting unit by the sensing members, the self gain adjustment is present in each sensing member. So, the signal may be transmitted by a long distance without being interfered by the noise caused by the external traces. Because the manufacturing tolerance does exist, the protection layer with the designed thickness of 100 um may have the thickness ranging from 80 to 130 um. Using the self gain adjustment, it is possible to eliminate the problem caused by the difference between the manufacturing processes, and to effectively enhance the image uniformity and sensitivity adjustment. This is the most important issue for any sensing member array. The gain of each sensing member may be independently adjusted to achieve the uniform image and signal intensity.

Figure 7:
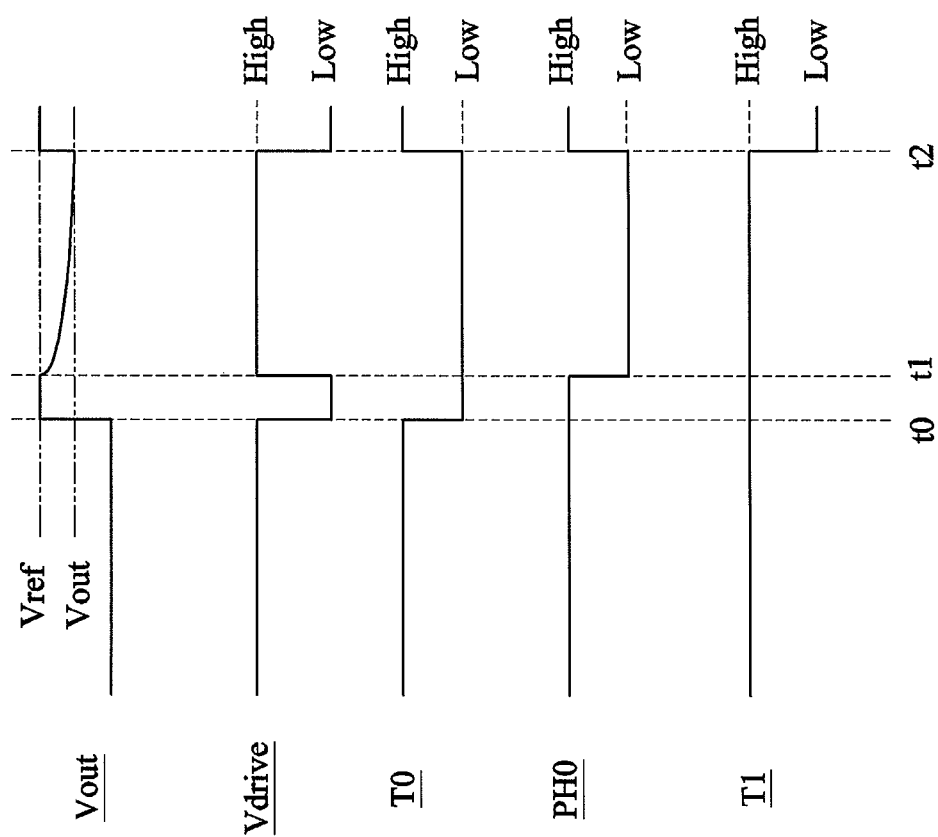
FIG. 7 is a control timing chart of the single sensing member of the capacitive sensing array device according to the second embodiment of the invention.

FIG. 7 is a control timing chart of the single sensing member of the capacitive sensing array device 1 according to the second embodiment of the invention. As shown in FIG. 7, in the duration from time t0 to t1, the switch T0 is set as the open-circuited state, the switch T1 is set as the short-circuited state, and the switch PH0 is set as the short-circuited state. At this time, the coupling signal Vdrive has the low level (0V in this embodiment), and this stage is the pre-charge operation of the operational amplifier of the sensing member. Then, in the duration from time t1 to t2, Vdrive is set to the high level (3.3V in this embodiment), the switch T0 continuously keeps in the open-circuited state, the switch T1 continuously keeps in the short-circuited state, but the switch PH0 switches to the open-circuited state. In this stage, the sensing operation of the sensing electrode 10 corresponding to the switch T0 is started by way of charge sharing, and the sensed result is amplified to obtain Vout by the operational amplifier inside the single sensing member. Similarly, each of the next sensing members also performs the operation mentioned hereinabove, so that the signals of the sensing member array can be completely read out. The output signal Vout represents the condition of the operation of each single sensing member and the to-be-tested object F.

Figure 8:
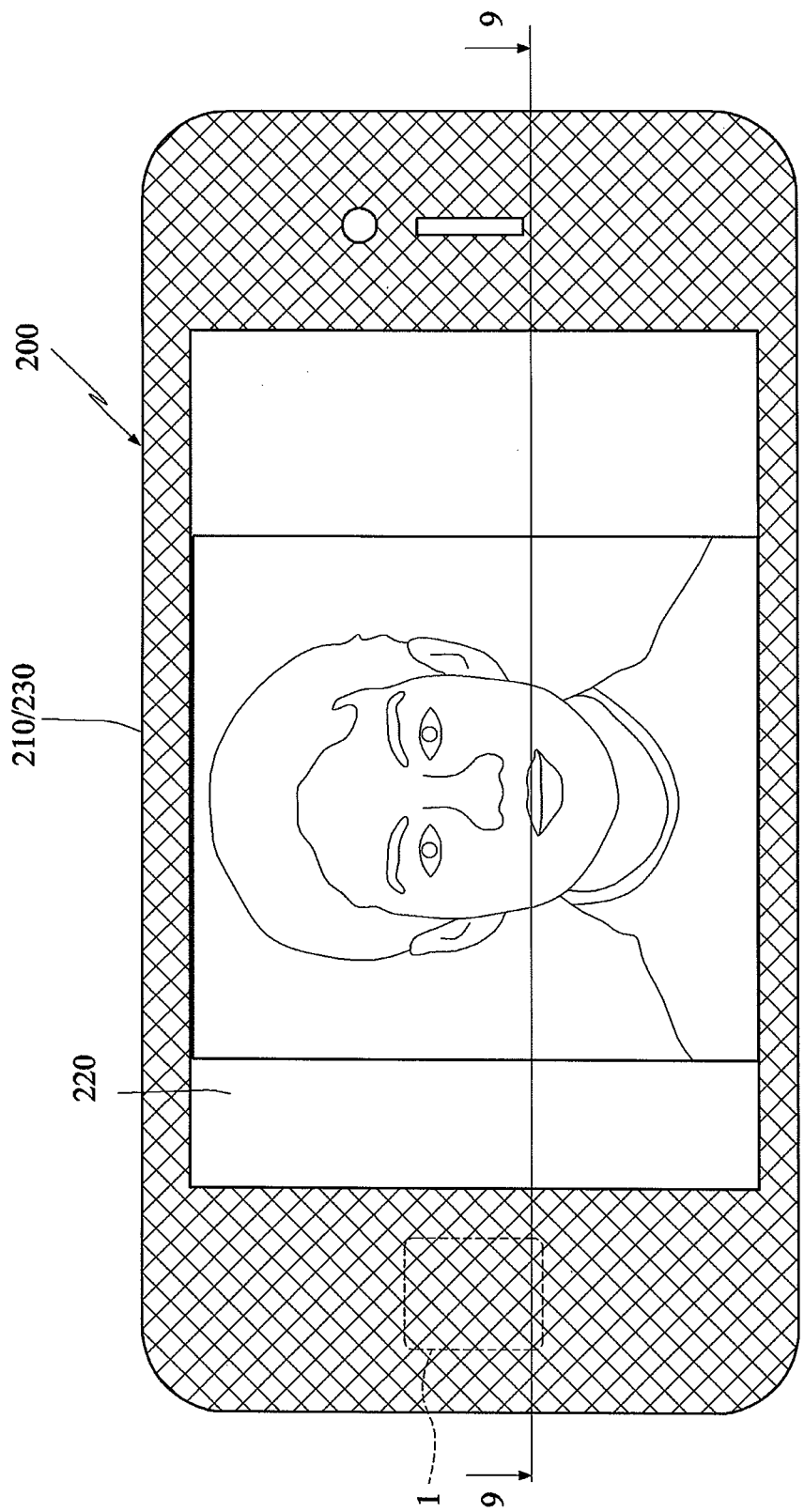
FIG. 8 is a schematic illustration showing an electronic apparatus according to the embodiment of the invention.
Figure 9:
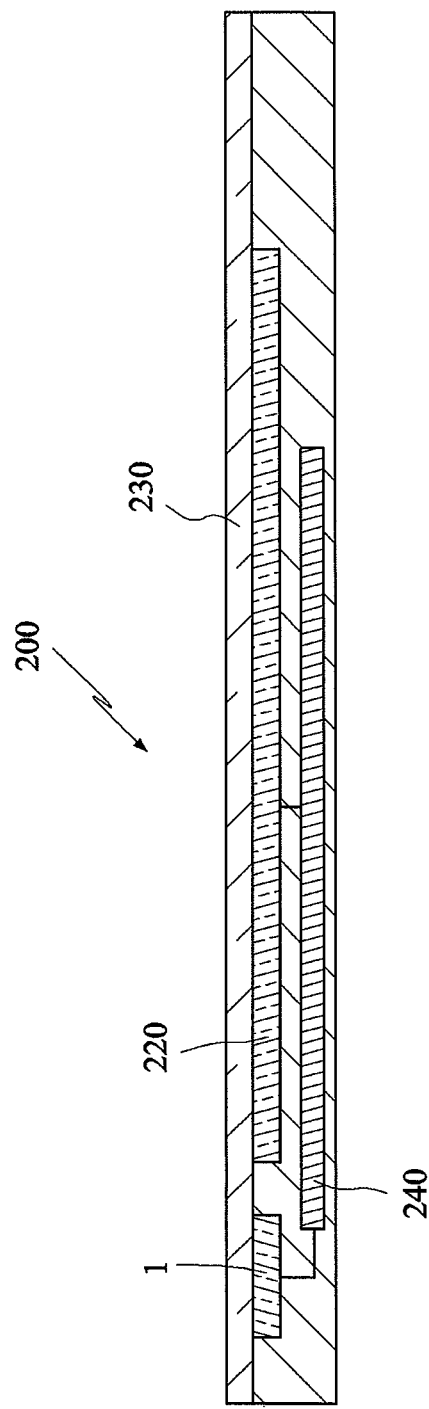
FIG. 9 is a cross-sectional view taken along a line 9-9 of FIG. 8.

FIG. 8 is a schematic illustration showing an electronic apparatus 200 according to the embodiment of the invention. FIG. 9 is a cross-sectional view taken along a line 9-9 of FIG. 8. Referring to FIGS. 8 and 9, the electronic apparatus 200 of the invention includes a body 210, a display 220, a capacitive sensing array device 1, a housing 230 and a processor 240. The display 220 mounted on the body 210 displays a frame. The capacitive sensing array device 1 is mounted on the body 210. The housing 230 is mounted on the body 210 and covers the display 220 and the capacitive sensing array device 1. The capacitive sensing array device 1 senses the pattern of the object F via the housing 230. The processor 240, electrically connected to the capacitive sensing array device 1 and the display 220, processes the pattern of the object F and interacts with a user through the display 220. The housing 230 may be transparent or opaque, and may also be, for example but without limitation to, an upper cover, a lower cover or a side cover of the electronic apparatus.

Figure 10:
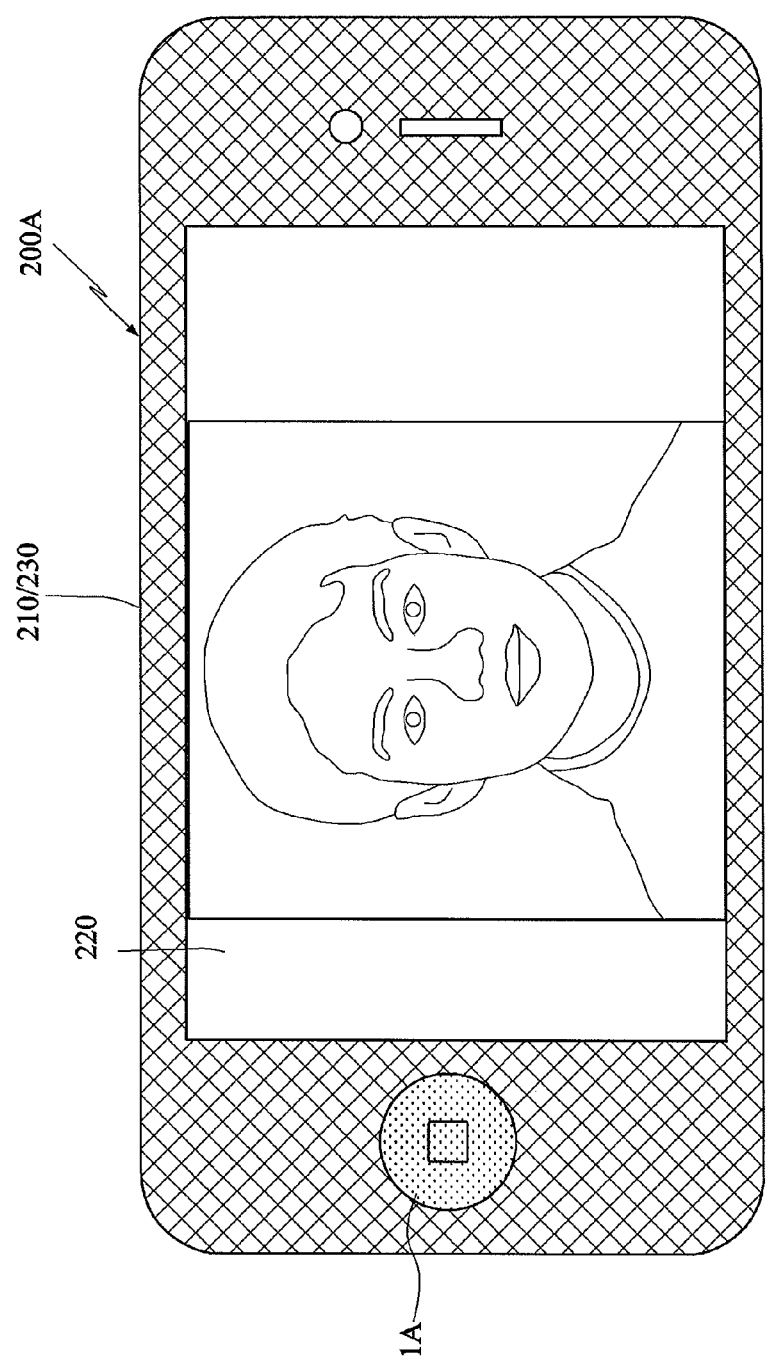
FIG. 10 is a schematic illustration showing another electronic apparatus according to the embodiment of the invention.

FIG. 10 is a schematic illustration showing another electronic apparatus 200A according to the embodiment of the invention. As shown in FIG. 10, the electronic apparatus 200A is similar to the electronic apparatus 200 of FIG. 8 except for the difference that the capacitive sensing array device 1A is exposed outside to function as a main button and an arrow button of the electronic apparatus 200A to facilitate the user recognizing at the button region. Thus, in addition of the provision of the function of sensing the object, the capacitive sensing array device may further provide the button function so that the user can input a control instruction, including, for example but without limitation to, the selection and movement instructions, through the capacitive sensing array device.

With the capacitive sensing array device of the invention, even if the capacitive sensing array device is covered by the protection layer and the housing in contact with the finger, the high sensitivity still can be obtained, and the sensed result cannot be affected by the parasitic capacitor. Furthermore, the uniformity of the sensed image can be further enhanced according to the self gain adjustment.

While the present invention has been described by way of examples and in terms of preferred embodiments, it is to be understood that the present invention is not limited thereto. To the contrary, it is intended to cover various modifications.

Therefore, the scope of the appended claims should be accorded the broadest interpretation so as to encompass all such modifications.

What is claimed is:

1. A fingerprint capacitive sensing array device with high sensitivity, comprising:
    sensing electrodes separately arranged in an array, wherein each of the sensing electrodes and an object form a sensing capacitor;
    a shielding conductor layer disposed below the sensing electrodes;
    a constant voltage source providing a constant voltage to the shielding conductor layer so that a vertical parasitic capacitor is formed between the shielding conductor layer and each of the sensing electrodes; and
    switch modules each electrically connected to the constant voltage source via a corresponding one of the sensing electrodes, when one of the sensing electrodes is selected to perform sensing, the switch module corresponding to the selected sensing electrode is configured as an open-circuited state such that the selected sensing electrode is disconnected from the constant voltage source, while the other sensing electrodes are electrically connected to the constant voltage source via the other corresponding switch modules configured as short-circuited states, so that a horizontal parasitic capacitor is formed between the selected sensing electrode and the other sensing electrodes, wherein the sensing electrodes, and the shielding conductor layer are on the same side of a package substrate.

2. The fingerprint capacitive sensing array device according to claim 1, further comprising reading circuits, which are electrically connected to the sensing electrodes and output multiple output signals, respectively.

3. The fingerprint capacitive sensing array device according to claim 2, wherein each of the reading circuits comprises:
    an operational amplifier having a positive input terminal, a negative input terminal and an output terminal, wherein the negative input terminal is electrically connected to the sensing electrode and the positive input terminal is electrically connected to a reference voltage, so that an output of the capacitive sensing array device does not relate to the horizontal parasitic capacitor and the vertical parasitic capacitor;
    a tunable capacitor having a first terminal electrically connected to the negative input terminal, and a second terminal electrically connected to the output terminal; and
    a reset switch connected to the tunable capacitor in parallel.

4. The fingerprint capacitive sensing array device according to claim 3, wherein the tunable capacitor comprises:
    reference capacitors connected to the negative input terminal and the output terminal in parallel through multiple reference switches, respectively, wherein open-circuited states and short-circuited states of the reference switches are controlled to adjust a capacitance of the tunable capacitor.

5. The fingerprint capacitive sensing array device according to claim 4, further comprising:
    a reference switch controller, which is electrically connected to the reference switches and controls the open-circuited states and the short-circuited states of the reference switches.

6. The fingerprint capacitive sensing array device according to claim 5, wherein the reference switch controller turns on one of the reference switches at a time.

7. The fingerprint capacitive sensing array device according to claim 5, wherein the reference switch controller turns on multiple ones of the reference switches at a time.

8. The fingerprint capacitive sensing array device according to claim 5, wherein the reference capacitors have a capacitance.

9. The fingerprint capacitive sensing array device according to claim 5, wherein the reference capacitors have multiple capacitances.

10. The fingerprint capacitive sensing array device according to claim 3, wherein if the reference voltage is Vref, the coupling signal is Vdrive, the sensing capacitor is Cf, and the tunable capacitor has a capacitance of Ch, then a voltage Vout of the output terminal is represented by:

$$V\text{out}=V\text{ref}-(Cf/Ch)\times V\text{drive}.$$

11. The fingerprint capacitive sensing array device according to claim 1, further comprising:
    a coupling signal source providing a coupling signal coupled to the object;
    a semiconductor substrate, wherein the sensing electrodes, the shielding conductor layer, the coupling signal source, the constant voltage source and the switch modules are formed in the semiconductor substrate;
    a package substrate, wherein the semiconductor substrate is disposed on the package substrate;
    multiple wires electrically connecting first bonding pads of the package substrate to second bonding pads of the semiconductor substrate; and
    a package protection layer covering the semiconductor substrate, the wires, the first bonding pads and the second bonding pads.

12. The fingerprint capacitive sensing array device according to claim 11, wherein the package protection layer has an exposed surface in contact with the object, and the exposed surface is a flat surface.

13. An electronic apparatus, comprising:
    a body;
    a display mounted on the body, the display displaying a frame;
    the capacitive sensing array device according to claim 1, mounted on the body;
    a housing mounted on the body and covering the display and the capacitive sensing array device, wherein the capacitive sensing array device senses a pattern of the object via the housing; and
    a processor, which is electrically connected to the capacitive sensing array device and the display, processes the pattern of the object and interacts with a user through the display.

14. The electronic apparatus according to claim 13, wherein the capacitive sensing array device further provides a button function, through which the user inputs a control instruction.

15. A fingerprint capacitive sensing array device with high sensitivity, comprising:
    sensing electrodes separately arranged in an array, wherein each of the sensing electrodes and an object form a sensing capacitor;
    a shielding conductor layer disposed below the sensing electrodes;
    a constant voltage source providing a constant voltage to the shielding conductor layer so that a stable vertical parasitic capacitor is formed between the shielding conductor layer and each of the sensing electrodes;
    switch modules each electrically connected to the constant voltage source via a corresponding one of the sensing electrodes, when one of the sensing electrodes is selected to perform sensing, the switch module corresponding to the selected sensing electrode is configured as an open-circuited state such that the selected sensing electrode is disconnected from the constant voltage source, while the other sensing electrodes are electrically connected to the constant voltage source via the other corresponding switch modules configured as short-circuited states, so that a stable horizontal parasitic capacitor is formed between the selected sensing electrode and the other sensing electrodes;

an operational amplifier having a positive input terminal, a negative input terminal and an output terminal, wherein the negative input terminal is electrically connected to the sensing electrode and the positive input terminal is electrically connected to a reference voltage, so that an output of the capacitive sensing array device does not relate to the horizontal parasitic capacitor and the vertical parasitic capacitor;

a tunable capacitor having a first terminal electrically connected to the negative input terminal, and a second terminal electrically connected to the output terminal; and a reset switch connected to the tunable capacitor in parallel.

\* \* \* \* \*